United States Patent [19]

Sieg

[11] 4,330,397

[45] May 18, 1982

[54] FLUID-CONTACTING PROCESS

[75] Inventor: Robert P. Sieg, Walnut Creek, Calif.

[73] Assignee: Chevron Research Company, San Francisco, Calif.

[21] Appl. No.: 965,650

[22] Filed: Dec. 1, 1978

[51] Int. Cl.³ .................... B01J 35/02; C10G 25/00
[52] U.S. Cl. .................................. 208/149; 208/147; 208/152
[58] Field of Search ............... 208/149, 152, 49, 147

[56] References Cited

U.S. PATENT DOCUMENTS

| | | | |
|---|---|---|---|
| 2,307,610 | 1/1943 | Thomas | 208/43 |
| 2,441,170 | 5/1948 | Rose et al. | 208/149 |
| 2,476,729 | 7/1949 | Helmers | 208/149 |
| 2,631,921 | 3/1953 | Odell | 208/149 |
| 2,893,852 | 7/1959 | Montgomery | 208/149 |
| 3,990,964 | 11/1976 | Gustafson | 208/216 |

*Primary Examiner*—Delbert E. Gantz
*Assistant Examiner*—Olik Chaudhuri
*Attorney, Agent, or Firm*—D. A. Newell; M. K. Bosworth; W. L. Stumpf

[57] ABSTRACT

A fluid-contacting process wherein fluid is contacted with convex and polylobal particles, the contacting stopped, a mixture of the particles formed and subsequently separated by screening. Also disclosed is a catalytic conversion process wherein a reaction is carried out in the presence of convex and polylobal catalysts, the reacting stopped, the catalysts withdrawn as a physical mixture from which one of the catalysts is separated, regenerated and returned to the process.

6 Claims, No Drawings

FLUID-CONTACTING PROCESS

BACKGROUND OF THE INVENTION

1. Field of the Invention

This invention relates to a fluid-contacting process which uses a plurality of types of particle, such as a catalyst, in which the contacting is stopped, the particles mixed and separated. In another aspect, this invention relates to the separation, regeneration and return of a catalyst in a multi-catalyst catalytic conversion process.

2. Description of the Prior Art

In fluid-contacting processes, careful attention must be paid to the design of vessels and to the size of particles used in these vessels, in order to achieve maximum activity, effectiveness and life with minimum operating cost. In general, in vapor, liquid, or mixed-phase operation, smaller particles are preferred for better access of the fluid to all active surfaces within the particle, thus providing better effectiveness and life. However, larger particles are desired to reduce pressure drop, resulting in corresponding lower compression costs and vessel costs. These opposing objectives require an optimizing decision in the process design. These considerations are applied to processes such as sorption, ion exchange, catalytic conversion, etc., in which a fluid may be contacted with two or more different types of particle.

As the level of technology involved in fluid contacting processes becomes increasingly more sophisticated, the use of more than one type of contacting particle in a given process is becoming more common, especially when one of the types performs a different function from the other, e.g., a guard bed for a sorption bed or a catalyst bed. With special reference to catalytic processes, it is often advantageous to have more than one type of catalyst in a given reactor or in a reactor containing a plurality of beds. These different catalysts may differ initially in chemical composition or in physical properties such as pore size or surface area. The different catalysts may be tailored for different specific reactor locations, such as the top, middle or bottom of the reactor catalyst charge.

Eventually it will become necessary to empty the reactor, for such reasons as contamination or deactivation of the catalyst particles, or inspection of the internals of the reactor or reactors containing the catalyst. On emptying such a reactor, it is very difficult to avoid intermixing of the previously layered, different catalysts. Such intermixing is frequently undesirable for various reasons, including the lack of suitability of the mixture for reuse after ex-situ regeneration, the need for different regeneration conditions for one or more of the different catalysts, or loss of value in subsequent metals recovery because of higher metals recovery costs due to mixtures of hard-to-separate metals.

Separation of such mixed catalyst systems by physical separation methods, such as screening, is commonly practiced using catalysts of the same general shape but different dimensions—for example, mixtures of small and large cylindrical extrudates, balls, or tablets. However, use of bigger catalyst particles for one type of catalyst in the system would reduce catalytic effectiveness and activity, and the use of smaller catalyst particles would increase pressure drop and operating cost.

It is also known from the art to conduct a catalytic reaction using catalysts which have a polylobal shape. For example, U.S. Pat. Nos. 3,990,964; 3,966,644; and 3,674,680, which are incorporated herein by reference, describe catalysts having various polylobal shapes including dumbbell, figure eight, "C", trilobal, cross, clover leaf and tetralobal.

SUMMARY OF THE INVENTION

I have discovered an inexpensive and effective solution to the problem of conducting a fluid-contacting process employing a plurality of particle types, where the types will be mixed and subsequently separated. In accordance with one embodiment of the present invention, there is provided in a process for contacting a fluid with at least two types of fluid-contacting particle of different compositions and thereafter stopping said contacting, forming a mixture of said particle types and separating at least one of said particle types from said mixture by screening, an improvement which comprises:

(a) using as one of said particle types, particles having a convex shape; and (b) using as another of said particle types, particles having a polylobal shape, a different nominal diameter, and a similar or greater ratio of geometric surface area to volume than said convex particles, and a similar or lower pressure drop for a volume of said polylobed particle than for the same volume of said convex particles when measured at similar conditions. Preferably, at least one of said types of particle is a catalyst.

In accordance with another embodiment of the present invention, there is provided in a process for reacting a feed stream in the presence of at least two types of catalyst having different compositions, and thereafter stopping said reacting, forming a mixture of said catalyst types and separating at least one of said catalyst types from said mixture by screening, an improvement which comprises:

(a) using as one of said catalyst types, catalyst having a convex shape; and (b) using as another of said catalyst types, catalyst having a polylobal shape, a different nominal diameter, and a similar or greater ratio of geometric surface area to volume than said convex catalyst, and a similar or lower pressure drop for a volume of said polylobal catalyst than for the same volume of said convex catalyst when measured at similar conditions.

In yet another embodiment of the present invention there is provided a method for conducting a catalytic conversion process which comprises:

(a) conducting a desired reaction in a reactor containing a plurality of catalysts in layers, one of said catalysts having a convex shape and another of said catalysts having polylobal shape, a different nominal diameter and a similar or greater ratio of geometric surface area to volume than said convex catalyst, and a similar or lower pressure drop for a volume of polylobal catalyst than for the same volume of said convex catalyst, when measured at similar conditions;

(b) discontinuing said reaction; then (c) withdrawing said catalysts as a physical mixture; then performing steps (d) and (e) in any order;

(d) physically separating at least one of said catalysts from said mixture by screening;

(e) regenerating at least one of said catalysts at regenerating conditions;

(f) returning the resulting separated and regenerated catalyst to a layer in said reactor; and (g) resuming said reaction.

The convex shape will advantageously be selected from tablets, solid cylinders and balls, and the polylobal shape will advantageously have two, three or four lobes, and still more advantageously, three lobes.

DETAILED DESCRIPTION

The method of the present invention can be used for carrying out a fluid-contacting process irrespective of the particular application; however, it is especially useful for carrying out a catalytic process in which it is advantageous to separate a particular type of catalyst from a mixture of different types of catalysts. The particles or catalysts may be a part of any system where multiple particles or catalysts are employed and where a physical mixture of them is created. The method of the present invention is especially useful in fixed-bed catalytic hydrocarbon conversion reactions which employ two or more different catalysts, such as hydrotreating, hydrocracking, reforming, disproportionation, and the like. The catalysts used in these reactions may initially differ in physical properties such as pore size or surface area, or in chemical composition of the support or the catalytically active components. However, by the time of separation, the catalysts will usually have different chemical compositions either due to different initial compositions or different levels of contaminant. By using a convex particle as one of the catalysts and as another of the catalysts, a polylobal particle having a different nominal diameter than that of the convex particle, it is possible to separate them easily by conventional physical separation methods such as screening. After being separated, either or both of the catalysts may be sent for recovery of metal values or for regeneration and reuse in the catalytic conversion process. It is also possible for the catalysts to be regenerated before being separated, and once separated, one or more of them returned to their beds in a reaction zone.

As used herein, a convex particle is a geometric solid in which all pairs of points lying on or within the surface of the solid can be connected by a straight line which is substantially contained within the solid or surface thereof. Familiar examples of convex particles are extruded cylinders, balls and tablets. Of course, it is intended for convex particles which contain minor irregularities to still be considered convex particles. A polylobal particle is a geometric solid which in transverse cross-section shows two or more curved or rounded projections. The nominal diameter of such a particle is the maximal breadth across a transverse cross section. Familiar examples of polylobal particles include C-shaped particles, dumbbell-shaped particles, trilobal particles, cross-shaped particles, tetralobal particles, and figure-8-shaped particles. Methods of making particles of these shapes are described in U.S. Pat. Nos. 3,674,680 and 3,990,964. The polylobal particles used in the present invention will advantageously have one or more of the following characteristics: a volume-to-surface ratio between 0.42 to 0.001 inch; a diameter from 1/20 to ¼ inch; a length from ⅛ to ⅝ inch; and a size and configuration such that substantially all points within a particle are less than about 0.015 inch from the surface of the particle. The polylobal particles are preferably sized to have two or more and preferably three or more of the following parameters similar or superior to those possessed by the companion convexly shaped catalyst: catalytic or contacting activity and effectiveness, contacting efficiency, pressure drop, and gas flow properties. Catalytic or contacting effectiveness is the proportion of all active catalytic or contacting surfaces within the particle which are accessible to the reactants by diffusion and is represented by the surface area to volume ratio. The polylobal particles should have a similar catalytic or contacting effectiveness, e.g., at least 60%, and more preferably at least 75%, and still more preferably greater than that of the companion convex particles. Contacting efficiency relates to the flow characteristics of the reactant on the outside of the particle, and a similar contacting efficiency for the polylobal particles should be at least 60% of, and more preferably at least 75% of, and still more preferably greater than that of the convex particles. The catalytic or contacting activity, related to all of these factors, for the polylobal particle should be at least 60%, preferably at least 75%, and still more preferably greater than that of convex particles having the same composition. The similar pressure drop for equal volumes of the two particle types should be for the polylobal particles no more than 50% above, more preferably no more than 25% above, and still more preferably be the same or lower than that of the convex particles at similar conditions.

The fluid-contacting process of the present invention may be any fluid-contacting process in which a plurality of particles may be used, for example, sorption, ion exchange, catalytic conversions or the like. One of the shapes of particles will usually have a different chemical composition from the other particles, either at the beginning of the contacting, as a result of the contacting, or both. The exact physical structure and chemical composition of the particles and catalysts will vary, depending upon which contacting or catalytic process and feed are used, and the structure and composition as well as the contacting conditions should be well known to those skilled in the art. Likewise, methods for making and regenerating the particles or catalysts and recovering metal values from them are known to the art.

EXAMPLES

The invention will be further clarified by consideration of the following examples, which are intended to be purely exemplary of the use of this invention. Examples 1 to 5 illustrate several processes in which the present invention is useful, while Examples 6 and 7 show the advantages of forming a separate mixture of cylindrical and polylobal catalysts of different nominal diameters compared with a mixture of two cylindrical catalysts of different diameters.

EXAMPLE 1

A downflow hydrotreating reactor is placed into service. The top 90% of the reactor catalyst bed contains 1/16-inch diameter extruded cylindrical hydrodenitrogenation catalyst (having a 0.053-inch actual diameter). The catalyst is nickel-tungsten on a high-acid support. The lower 10% of the reactor bed contains 1/10-inch diameter extruded trilobed hydrodesulfurization catalyst (having a 0.092-inch diameter). This trilobed catalyst is nickelmolybdenum on a low-acid support. After being in service for some time, the catalyst begins to lose activity. The reaction is stopped and the catalysts are removed from the reactor as a mixture. The mixture is screened on a No. 10 mesh Tyler screen having a sieve opening of 0.0787 inch. The cylinders will fall through the openings in the screen, while the trilobed particles will remain on the surface. Each catalyst may be separately regenerated and returned to its appropriate location in the catalyst bed.

If denitrogenation and desulfurization catalysts were of similar size, it is most likely that new hydrodesulfurization catalyst would be used on the lower level and that the catalyst mixture (containing only 90% of the desired hydrodenitrogenation catalyst) would be replaced in the main body of the reactor bed. Thus, the process of the present invention will enable one to prevent decreasing catalyst efficiency due to dilution of a desired catalyst and to reduce replacement of expensive catalysts.

EXAMPLE 2

A reactor is filled with catalyst as described in Example 1. When the reactor is removed from service and the catalyst withdrawn as a mixture, it is desired to send the catalyst to metals recovery. Metal values can be recovered from a catalyst containing nickel-molybdenum or one containing nickel-tungsten, as long as the catalysts are separate. However, when the two are mixed it is very difficult to separate molybdenum from tungsten because of their closely related properties. If the process is carried out according to the present invention, the nickelmolybdenum catalyst can be separated from the nickeltungsten catalyst, and the separated catalysts can be sent to metals recovery.

EXAMPLE 3

A reactor is charged with a hydrodemetalation catalyst containing nickel and molybdenum. The lower 80% of the catalyst bed contains a conventional ⅛-inch extruded cylindrical catalyst and the top 20% contains ¼-inch nominal-diameter trilobed macroporous catalyst. A feedstock containing iron, nickel and vanadium impurities is treated by the catalyst, and most of the metals are found to separate out in the top 20% of the catalyst bed. After about 3 months of operation, the metals fill the pores of the trilobed catalyst and deposit upon the outside of the catalyst and then plug the reactor. The reactor is withdrawn from service and the catalyst dumped. The resulting mixture of catalysts is screened to separate the metals-laden trilobed catalyst. The reactor is recharged with the screened cylindrical catalyst, new trilobed catalyst is placed in the top 20% of the bed, and the reactor is again placed into service. The process of the present invention thus allows removal of contaminated catalyst without the necessity of replacing all of the catalyst in the reactor.

EXAMPLE 4

A downflow reforming reactor is charged with 1/16-inch nominal-diameter extruded cylindrical platinum-rhenium-containing catalyst in the lower 75% of the catalyst bed and a 1/10-inch nominal-diameter trilobed catalyst containing platinum and rhenium in the top 25% of the bed. The reactor is placed into service and inadvertently some arsenic-containing feed is charged to the reactor. Arsenic is a catalyst poison, which will eventually poison much of the catalyst as it migrates through the catalyst bed. However, when the arsenic contamination is discovered, the reactor is removed from service and the catalyst removed from the reactor. The trilobed catalyst which contains the arsenic is separated from the rest of the catalyst by screening. The remaining catalyst is replaced in the reactor, fresh trilobed catalyst is added to the top of the bed, and the reactor is again placed into service. In this situation, the use of trilobed catalyst as a guard bed eliminates the necessity of operating the reactor at reduced efficiency or of replacing the entire catalyst bed.

EXAMPLE 5

A saturated hydrocarbon disproportionation reaction is carried out over a catalyst mass consisting of platinum-on-alumina particles mixed with tungsten oxide-on-silica particles. The platinum-on-alumina particles are in a trilobed shape having a 1/10-inch nominal diameter, and the tungsten oxide-on-silica particles are in the shape of 1/16-inch nominal diameter extruded cylinders. When the catalyst mass becomes deactivated, it can be removed from the reactor, the two types of particles separated easily by screening, and they may then be sent for regeneration or metals recovery. The two types of particles should be separate for the optimum regeneration of each type to be carried out, and they should be separate to minimize the expense of metals recovery, because generally the more species there are to be separated, the more expensive the overall metals recovery is.

EXAMPLE 6

Three catalysts were prepared and compared for catalytic activity and relative pressure drop, as is described in U.S. Pat. No. 3,980,552. All three catalysts contained by weight 4% CoO, 12% $MoO_3$ and 2% $SiO_2$, with the balance alumina. The first catalyst (A) was a 1/16-inch cylindrical extrudate having a surface area to volume ratio of about 75 reciprocal inches. The second (B) was a symmetrical trilobed catalyst, with each lobe defined by a 240° arc of a circle having a diameter of about 0.026 inches, and which had a surface area to volume ratio of about 120 reciprocal inches. The third catalyst (C) was a 1/32-inch cylindrical extrudate having a surface area to volume ratio of 140 reciprocal inches.

A sample of each of these catalysts was activity tested for desulfurization of a Kuwait atmospheric residuum having a 50% boiling point of 505° C., a specific gravity of 0.9548, a sulfur content of 3.7 weight percent, an asphaltene content of 5.6 weight percent, a vanadium content of 33 ppm and a nickel content of 13 ppm. The test was carried out over a 5-day period at a hydrogen partial pressure of 54.4 atm., gauge; a liquid hourly space velocity of 0.5; a hydrogen/oil ratio of 712 cubic meters of hydrogen at 15.6° C. and 1 atm., absolute, per cubic meter of oil; and the temperature was adjusted (in the neighborhood of 354° C.) to achieve a target 75% desulfurization. Another sample of each of these catalysts was subjected in a compacted isometric bed to a standard pressure drop test, involving measurement of pressure drop through the beds under standard gas flow rate conditions. The results of the catalyst activity and pressure drop tests are shown in Table I.

TABLE I

|  | Catalyst | | |
| --- | --- | --- | --- |
|  | (A) | (B) | (C) |
| Shape of extrudate | 1/16" cylinder | 1/22" trilobe | 1/32" cylinder |
| Nominal diameter, inches | 0.059 | 0.045 | 0.032 |
| Average length, inches | 0.177 | 0.167 | 0.122 |
| Relative pressure drop | 1.00 | 0.96 | 2.32 |
| Ratio surface area/volume, $inch^{-1}$ | 75 | 120 | 140 |
| Relative activity | 80 | 146 | 165 |

These results show the advantage of forming a separable catalyst mixture of a 1/16-inch diameter cylindrical catalyst and a 1/22-inch trilobed catalyst in comparison to a mixture of the 1/16-inch and 1/32-inch diameter cylindrical catalysts. Taking the 1/16-inch cylindrical catalyst as a reference, the 1/32-inch cylindrical catalyst has a much higher activity, but the pressure drop is also much higher. In contrast, the trilobed catalyst has both a higher activity and a slightly lower pressure drop than the 1/16-inch cylindrical catalyst. Also, the catalytic effectiveness (represented by the surface area to volume ratio) is higher for the trilobed catalyst than the 1/16-inch cylindrical catalyst. The difference in diameters between the trilobed catalyst and the 1/16-inch cylindrical catalyst is sufficient for them to be separated by screening on a 1.41 or 1.19 mm Standard sieve (14 or 16 Tyler mesh) having sieve openings of 0.055 and 0.0469 inches, respectively. Thus, the use of a smaller trilobed catalyst together with a cylindrical (convex) catalyst allows formation of a separable mixture while not adversely affecting important parameters such as pressure drop, activity or catalytic effectiveness of the mixture.

EXAMPLE 7

Three more catalysts (D), (E) and (F) were prepared and compared for catalytic activity, effectiveness, and relative pressure drop, as is described in U.S. Pat. No. 3,990,964. All three catalysts contained by weight 3% cobalt oxide and 15% molybdenum oxide, with the balance alumina. Catalyst (D) was a 1/16-inch cylindrical extrudate having a surface area to volume ratio of 89 reciprocal inches. Catalyst (E) was a trilobed catalyst, with each lobe defined by about 230° arc of a circle having a diameter of 0.0477 inch and with a surface area to volume ratio of 75 reciprocal inches. Catalyst (F) was a ⅛-inch cylindrical extrudate having a surface area to volume ratio of 45 reciprocal inches. A sample of each of these catalysts was presulfided and activity tested for desulfurization of a heating oil having a boiling range of 224°–331° C., a specific gravity of 0.8540, a sulfur content of 1.4 weight percent and a basic nitrogen content of 35 ppmw. The test was carried out at 316° and 371° C., a presure of 34 atm., gauge, a liquid hourly space velocity of 4 and a hydrogen-to-oil ratio of 178 cubic meters of $H_2$ at 15.6° C. and 1 atm. absolute per cubic meter of oil. The results of these tests are shown in Table II.

TABLE II

|  | Catalyst | | |
|---|---|---|---|
|  | (D) | (E) | (F) |
| Shape of extrudate | 1/16" cylinder | 1/10" trilobe | ⅛" cylinder |
| Ratio, surface area/volume, inch$^{-1}$ | 89 | 75 | 45 |
| Relative activity @316° C., by vol. | 100 | 115 | 92 |
| Relative activity @371° C., by vol. | 100 | 116 | 88 |
| Relative activity @316° C., by wt. | 100 | 115 | 87 |
| Relative activity @371° C., by wt. | 100 | 116 | 83 |

Another sample of catalysts (D), (E) and (F) is subjected to a pressure drop test by passing air flowing at 3 SCFM through a tube filled with 50 cc of the catalyst. The results of the catalyst activity and pressure drop tests are shown in Table III.

TABLE III

|  | Catalyst | | |
|---|---|---|---|
|  | (D) | (E) | (F) |
| Shape of extrudate | 1/16" cylinder | 1/10" trilobe | ⅛" cylinder |
| Nominal diameter, inches | 0.053 | 0.092 | 0.113 |
| Average length, inches | 0.142 | 0.180 | 0.201 |
| ABD, grams/cc | 0.71 | 0.70 | 0.74 |
| Relative pressure drop | 100 | 72 | 44 |

These results show the advantages of forming a separable catalyst mixture of a 1/16-inch diameter cylindrical catalyst and a 1/10-inch trilobed catalyst in comparison to a mixture of the 1/16-inch diameter cylindrical catalyst and a ⅛-inch cylindrical catalyst. Taking the 1/16-inch cylindrical catalyst as a reference, the ⅛-inch cylindrical catalyst has a lower pressure drop, but the activity is much lower. In contrast, the trilobed catalyst has both a lower pressure drop and a higher activity. The catalytic effectiveness of the trilobed catalyst is only slightly below (16%) that of the 1/16-inch cylindrical catalyst in spite of the larger nominal diameter. The difference in diameters between the trilobed catalyst and the 1/16-inch cylindrical catalyst is sufficient for them to be separated by screening on a 2.00 or 1.68 mm Standard sieve (9 or 10 Tyler mesh) having sieve openings of 0.0787 and 0.0661 inch, respectively. Thus, the use of a larger trilobe catalyst, together with a cylindrical (convex) catalyst allows formation of a separable mixture while not significantly adversely affecting important parameters such as pressure drop, activity or catalytic effectiveness of the mixture.

Other embodiments of the invention will be apparent to those skilled in the art from a consideration of the specification or practice of the invention as disclosed herein. It is intended that the specification and examples be considered exemplary only, with the true scope and spirit of the invention being indicated by the following claims.

What is claimed is:

1. In a process for contacting a fluid with at least two types of fluid-contacting particle disposed as discrete layers in a fixed bed and having different compositions and thereafter stopping said contacting, forming a mixture of said particle types and separating at least one of said particle types from said mixture by screening, the improvement which comprises:

(a) using as one of said particle types, particles having a convex shape; and (b) using as another of said particle types, particles having a polylobal shape, a different nominal diameter, and a similar or greater ratio of geometric surface area to volume than said convex particles, and a similar or lower pressure drop for a volume of said polylobed particles than for the same volume of said convex particles, when measured at similar conditions.

2. The method of claim 1 wherein at least one of said types of fluid-contacting particle is a catalyst.

3. In a process for reacting a feed stream in the presence of at least two types of catalyst disposed as discrete layers in a fixed bed and having different compositions, and thereafter stopping said reacting, forming a mixture of said catalyst types and separating at least one of said catalyst types from said mixture by screening, the improvement which comprises:

(a) using as one of said catalyst types, catalyst having a convex shape; and
(b) using as another of said catalyst types, catalyst having a polylobal shape, a different nominal diameter, and a similar or greater ratio of geometric surface area to volume than said convex catalyst, and a similar or lower pressure drop for a volume of said polylobal catalyst than for the same volume of said convex catalyst when measured at similar conditions.

4. A method for conducting a catalytic conversion process which comprises:
(a) conducting a desired reaction in a reactor containing a plurality of catalysts in discrete layers in a fixed bed, one of said catalysts having a convex shape and another of said catalysts having polylobal shape, a different nominal diameter and a similar or greater ratio of geometric surface area to volume than said convex catalyst, and a similar or lower pressure drop for a volume of polylobal catalyst than for the same volume of said convex catalyst, when measured at similar conditions;
(b) discontinuing said reaction; then
(c) withdrawing said catalysts as a physical mixture; then performing steps (d) and (e) in any order;
(d) physically separating at least one of said catalysts from said mixture by screening;
(e) regenerating at least one of said catalysts at regenerating conditions;
(f) returning the resulting separated and regenerated catalyst to a layer in said reactor; and
(g) resuming said reaction.

5. The method of claims 1, 3 or 4 wherein said convex shape is selected from tablets, solid cylinders and balls.

6. The method of claims 1, 3 or 4 wherein said polylobal shape is selected from dilobes, trilobes or tetralobes.

* * * * *